United States Patent

Hinich et al.

[11] Patent Number: 6,142,657
[45] Date of Patent: Nov. 7, 2000

[54] INTEGRATED HEADLAMP SYSTEM FOR MOTOR VEHICLES

[75] Inventors: Dana Hinich, Canton, Mich.; Drew Donald Mosser, Ilmer, Pa.

[73] Assignee: Visteon Global Technologies, Inc., Dearborn, Mich.

[21] Appl. No.: 09/303,930

[22] Filed: May 3, 1999

[51] Int. Cl.[7] .................................................. F21V 14/04
[52] U.S. Cl. ........................ 362/515; 362/282; 362/433; 362/514; 362/539
[58] Field of Search ..................... 362/277, 282, 362/287, 421, 514, 515, 528, 538, 539, 433

[56] References Cited

U.S. PATENT DOCUMENTS

| | | | |
|---|---|---|---|
| 4,298,912 | 11/1981 | Dearth | 362/490 |
| 4,569,007 | 2/1986 | Dick | 362/294 |
| 4,679,125 | 7/1987 | Dick | 362/523 |
| 5,113,331 | 5/1992 | Nagengast | 362/267 |
| 5,138,532 | 8/1992 | Shirai et al. | 362/515 |
| 5,142,455 | 8/1992 | Kosmatka | 362/514 |
| 5,169,224 | 12/1992 | Segoshi et al. | 362/539 |
| 5,567,035 | 10/1996 | Dobler et al. | 362/514 |
| 5,707,134 | 1/1998 | Nishizawa | 362/460 |
| 5,735,596 | 4/1998 | Daumueller | 362/267 |
| 6,039,466 | 3/2000 | Duchenne et al. | 362/515 |

*Primary Examiner*—Alan Cariaso
*Attorney, Agent, or Firm*—Chuck H. Ellerbrock

[57] ABSTRACT

A lamp assembly (12, 12A) has a lamp housing (14) and a lens (16) cooperatively forming an enclosure within which an electric light bulb (78) is disposed to place a focal point (82) of the bulb at the focus of a parabolic reflector surface (56) of a reflector (52) that is also disposed within the enclosure. The reflector collects light from the bulb and reflects it as a beam through the lens. A socket (76) that holds the bulb mounts in a rear wall (24) of the enclosure, and the reflector has a through-aperture (74) through which the bulb passes. A positioning mechanism (84) selectively positions the reflector about an axis (61) perpendicularly intersecting the bulb axis (26) to aim the light beam. As the reflector is being positioned, the bulb remains stationary, and the focus of the parabola remains at the focal point of the bulb.

11 Claims, 3 Drawing Sheets

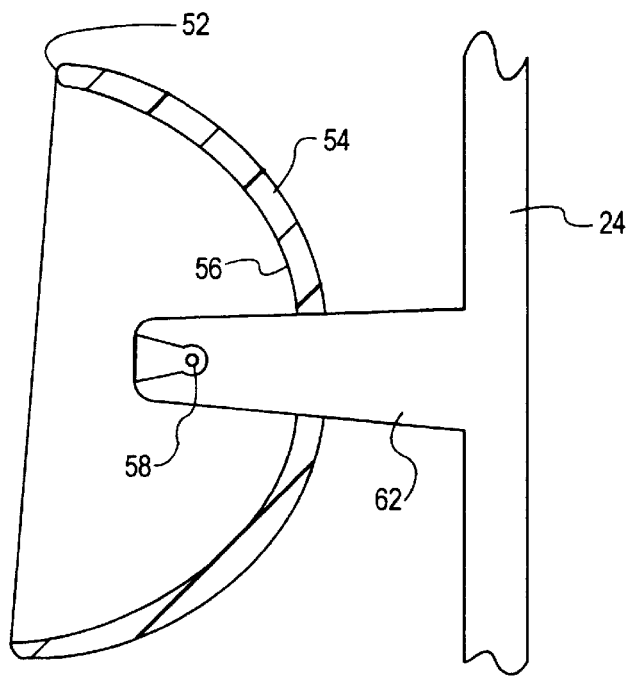
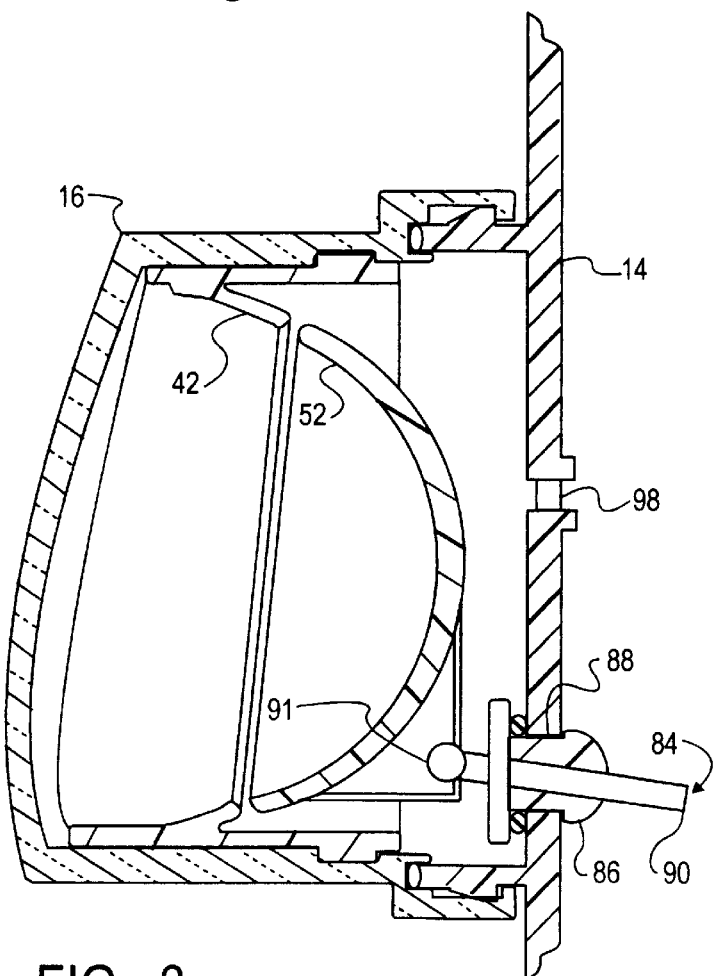
FIG. 2
FIG. 3

INTEGRATED HEADLAMP SYSTEM FOR MOTOR VEHICLES

BACKGROUND OF THE INVENTION

1. Field of the Invention

This invention relates generally to motor vehicle lighting systems, and more particularly to an integrated headlamp system that provides forward exterior illumination for a motor vehicle.

2. Background Information

The availability of replaceable light bulbs that can provide illumination intensities suitable for motor vehicle headlamps offers new opportunities for headlamp and vehicle front end design. It is possible to style headlamps for improved aesthetic compatibility with a motor vehicle front end. While vehicle stylists may enjoy this greater design freedom, it remains important that headlamp design address manufacturing, installation, and service considerations. The ability to efficiently fabricate a quality headlamp and assemble it into a new motor vehicle at low cost provides obvious benefits. The ability for a consumer to conveniently and economically replace individual components in case of damage, or simply to replace a burned-out light bulb, are also important. An ability to quickly aim a headlamp is useful both during manufacture of a new motor vehicle and over the life of the vehicle.

U.S. Pat. Nos. 4,298,912; 4,569,007; 4,679,125; 5,113,331; 5,707,134; and 5,735,596 are representative of patents relating to motor vehicle lamps.

SUMMARY OF THE INVENTION

The present invention relates to improvements in motor vehicle lamps, particularly headlamps, for promoting economy, utility, and convenience to both manufacturer and consumer. One aspect of the invention relates to a better integration of parts that make lamp fabrication and assembly more economical while still enabling a headlamp to be styled for desired front-end compatibility, and to be conveniently serviced when needed. Another aspect relates to a novel mechanism for aiming a headlamp.

Other general and more specific aspects will be set forth in the ensuing description and claims.

BRIEF DESCRIPTION OF THE DRAWINGS

The drawings that will now be briefly described are incorporated herein to illustrate a preferred embodiment of the invention and a best mode presently contemplated for carrying out the invention.

FIG. 2 is an elevation view, in cross section, as taken along line 2—2 in FIG. 1, with certain detail omitted.

FIG. 3 is an elevation view, in cross section, as taken along line 3—3 in FIG. 1, with certain detail omitted.

DESCRIPTION OF THE PREFERRED EMBODIMENT(S)

Figure 1:
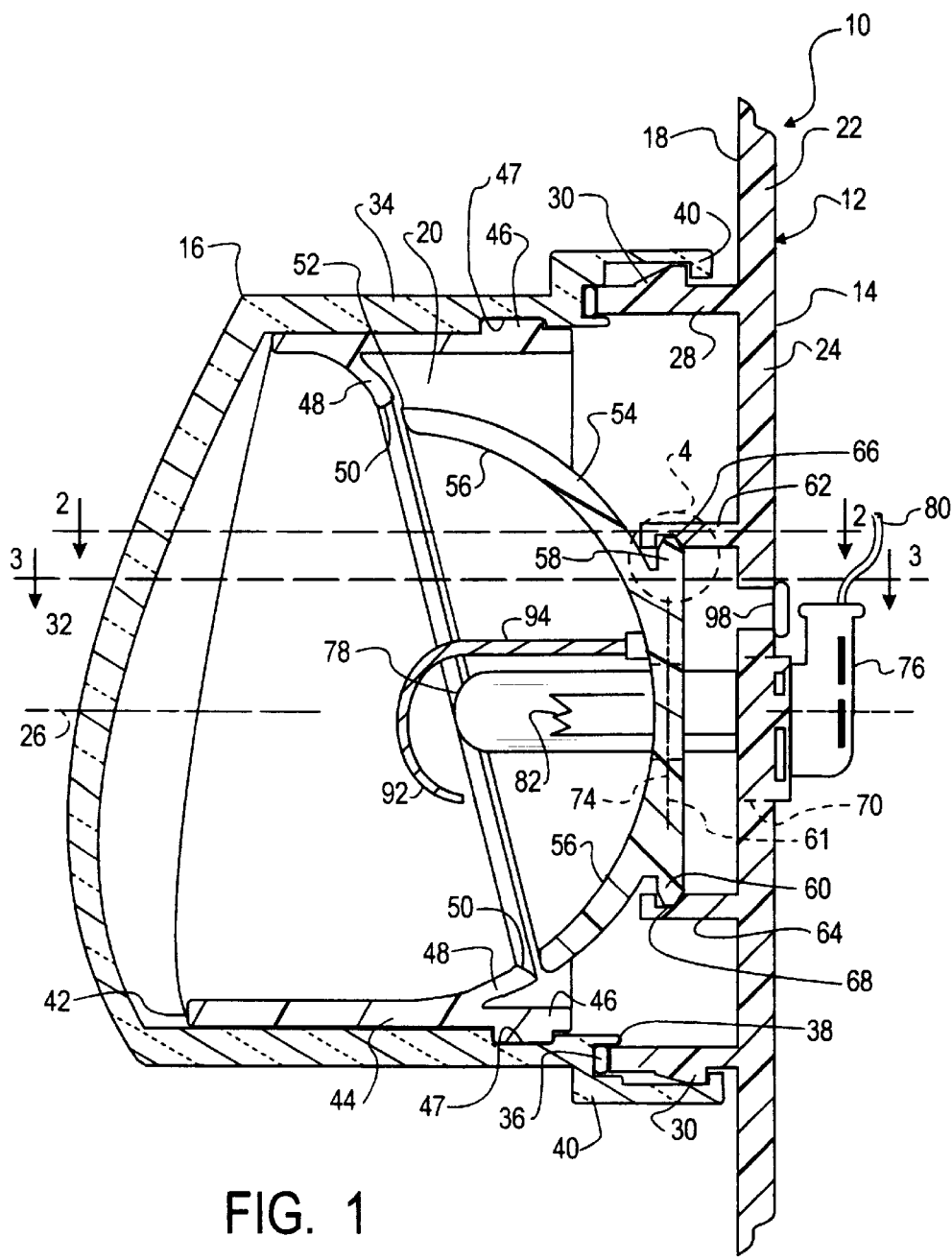
FIG. 1 is a horizontal plan view, in cross section, of a first example of an integrated headlamp system for a motor vehicle embodying principles of the present invention.
Figure 4:
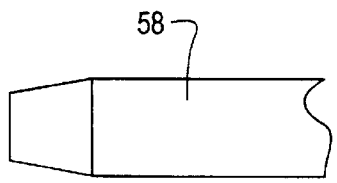
FIG. 4 is an enlarged view in circle 4 of FIG. 1.

FIGS. 1, 2, 3, and 4 show a first embodiment of integrated headlamp system 10 in accordance with principles of the present invention. System 10 comprises a headlamp assembly 12 in which a lamp housing 14 and a lens 16 cooperatively form a lamp enclosure that bounds an interior 20 of the headlamp assembly. Lamp housing 14 is provided as an integral part of an integrated front end system 18 of a motor vehicle. Such an integrated front end system comprises a polymeric part 22 in which housing 14 is an integral formation of the polymeric material. Examples of suitable materials for part 22 are polypropylene and PBT (polybutadieneterephthalate), and such a part may be fabricated by employing known molding machinery and processes.

Lamp housing 14 comprises a rear wall 24 that is generally transverse to an imaginary center line, or main axis, 26 that runs generally fore and aft in the vehicle, and a generally cylindrical side wall 28 that extends from rear wall 24 forward of, and circumferentially about, center line 26. Side wall 28 includes integrally formed catches 30 at several circumferential locations on its outer surface.

Lens 16 comprises a front end wall 32 that appears as a coutoured shape, but may nonetheless be considered to be disposed generally transverse to center line 26. Lens 16 further comprises a side wall 34 that extends rearward from the perimeter of front end wall 32. Lens 16 may be fabricated from any suitable transparent material, such as polycarbonate, by employing known fabrication equipment and processes. Lens side wall 34 terminates in a shape for closing the open front of housing side wall 28 to hermetically seal interior 20.

A suitable sealing gasket 36 is received in a rearward facing groove 38 in a perimeter edge of lens side wall 34 to be captured axially between an end edge of housing side wall 28 and a bottom surface of groove 38 when housing 14 and lens 16 are assembled together to enclose interior 20. Catches 40 are distributed circumferentially about lens side wall 34 in circumferential registration with housing catches 30 to provide for the removable attachment of lens 16 to housing 14. Catches 40 project rearward from lens 16 to pass over and lodge behind housing catches 30. Catches 30 and 40 are shown to have complementary shapes for mutual catching engagement that provides for snap-on, snap-off attachment of lens 16 to housing 14, enabling gasket 36 to function as a repeatable hermetic seal each time that lens 16 is re-attached to housing 14.

Assembled to lens 16 is a bezel 42 comprising a cylindrical ring 44 forming a wall that fits closely within lens side wall 34. The outer surface of ring 44 includes raised formations 46 that fit into complementary depressed formations 47 in the inner surface of lens side wall 34, thereby keeping the bezel secured in place on the lens. Bezel 42 further includes an integral flange, or lip, 48 on the inner surface of ring 44. Flange 48 has a radially inner edge circumscribing an opening 50 that provides dimensional clearance to a reflector 52 that is disposed within interior 20 generally on center line 26. Like lens 16 and housing 14, bezel 42 may be a polymeric part fabricated by using known molding apparatus and techniques.

Reflector 52 comprises a concave-convex wall 54 having a mirrored reflecting surface 56 that is concave about center line 26. Like other parts already described, reflector 52 may be a polymeric part fabricated by using known molding apparatus and techniques. Reflecting surface 56 is a material of suitable reflectivity applied to the concave surface of polymeric reflector 52 through use of known apparatus and methods, such as vacuum metalizing for example.

Opposite its concave surface, reflector 52 has a convex surface. To either side of center line 26, a respective pivot 58, 60 projects from reflector 52 along an imaginary axis 61 that is perpendicular to center line 26. Pivots 58, 60 are integral formations of reflector 52, each one having a proximal end merging with the convex surface of reflector 52. The distal, or free, end of each pivot has a frustoconical taper, and an intermediate portion of each pivot has a circular cylindrical shape. It is via pivots 58, 60 that reflector 52 pivotally mounts on pivot support arms 62, 64 of housing 14.

Each pivot support arm 62, 64 is an integral formation of housing 14. They are disposed symmetrically about center line 26, one to each side of, and parallel to, center line 26. The proximal end of each support arm 62, 64 merges with the front surface of housing rear wall 24. The distal end of each support arm contains a respective bearing 66, 68 for accepting, and journaling, a respective pivot 58, 60 to thereby pivotally mount reflector 52 on the lamp assembly within interior 20 for selective positioning about imaginary axis 61. The respective bearings 66, 68 are provided by circular through-holes in the pivot support arms within which the circular intermediate portions of the respective pivots are disposed.

Rear wall 24 contains a through-hole 70 that lies on center line 26 and is open to interior 20. Reflector 52 is disposed within interior 20 frontally of through-hole 70. Reflector 52 comprises a central through-aperture 74 that also lies on center line 26.

An electric light bulb socket 76 mounts on rear wall 24, fitting to, sealed to, and passing through, through-hole 70 into interior 20. Socket 76 comprises a frontally open receptacle that receives the base of an electric light bulb 78 disposed within interior 20. Socket 76 serves to electrically connect bulb 78 to external wiring 80 which extends from an end of socket 76 that remains external to interior 20 and which leads to a circuit (not shown) for supplying electric current to the bulb. The bulb's longitudinal axis coincides with axis 26 to place the bulb's focal point from which light emanates, such as an internal filament 82, on axis 26.

Lamp assembly 12 further includes a positioning mechanism 84 for selectively positioning reflector 52 about axis 61 to aim the headlamp. Positioning mechanism 84 comprises a base, or mounting element, 86 that mounts on housing 16, fitting to a through-hole 88 in housing rear wall 24. An elongate positioning element 90 passes through base 86 and has an external end that remains external to interior 20 and an internal end that operatively connects to reflector 52 within interior 20 at a location that is spaced radially of axis 61. The operative connection comprises a ball joint 91. Positioning element 90 and base 86 may be constructed to have mutual screw-threaded engagement such that turning of positioning element 90 in respective opposite senses about its own axis is effective to respectively advance and retract the positioning element relative to base 86, and hence housing 14. Such advancement and retraction is effective to impart pivotal movement to reflector 52 in respective opposite senses about axis 61, and thereby selectively position the reflector.

The ball joint may comprise a cup on reflector 52 within which a ball on the end of element 90 is captured in any suitable manner that allows the ball to swivel in the cup without excess play as element 90 is turned within base 86 to pivot the reflector. Because of geometric constraints imposed on the ball joint by virtue of the pivotal mounting of reflector 52 and the direction of the line of action of element 90 on the reflector, the interaction between the reflector and the positioning element creates a certain resistance to turning of positioning element 90 within base 86. That resistance is sufficiently small to permit manual aiming of the headlamp by use of a suitable tool engaging the external end of element 90, but sufficiently large to maintain the reflector in the aimed position after such adjustment.

Through-aperture 74 has a shape that avoids interference between bulb 78 and reflector 52 over the full range of selective positioning of the reflector. Likewise, bezel opening 50 is large enough to avoid interference with the reflector. Yet, through-aperture 74 is sufficiently small to minimize the area of the concave reflector surface that is lost due to its presence. For example, through-aperture 74 may be a vertically elongate slot.

A purpose that is served by bezel 42 is to block external viewing of interior 20 through the portion of lens side wall 34 that is covered by bezel ring 44. For such purpose, bezel 42 is opaque. The surfaces of bezel flange 48 and of the forwardly contiguous portion of bezel ring 44 may present any appearance that may be desired for a particular vehicle. Similarly, various shapes may be imparted to both bezel 42 and lens 16 for compatibility with front end styling of a particular vehicle.

In order to block direct external viewing of light bulb filament 82, a semi-spherical bulb shield 92 is disposed frontally of bulb 78. The shield includes a narrow stand-off 94 that runs alongside the bulb and attaches to reflector 52.

Reflecting surface 56 serves to collect light from bulb 78 and reflect it as a forwardly projected beam that passes through lens 16 for illuminating an area frontally of the vehicle. The particular geometry of concave reflecting surface 56 is selected to impart a desired shape to that light beam. The ability of positioning mechanism 84 to selectively position reflector 52 serves to aim the light beam in a desired direction. With axis 61 substantially horizontal, positioning of reflector 52 can sweep the light beam along a vertical arc. The external end of positioning element 90 may have a suitable surface that can be engaged by a complementary shaped tool to turn element 90 about its own axis for aiming the light beam.

Figure 5:
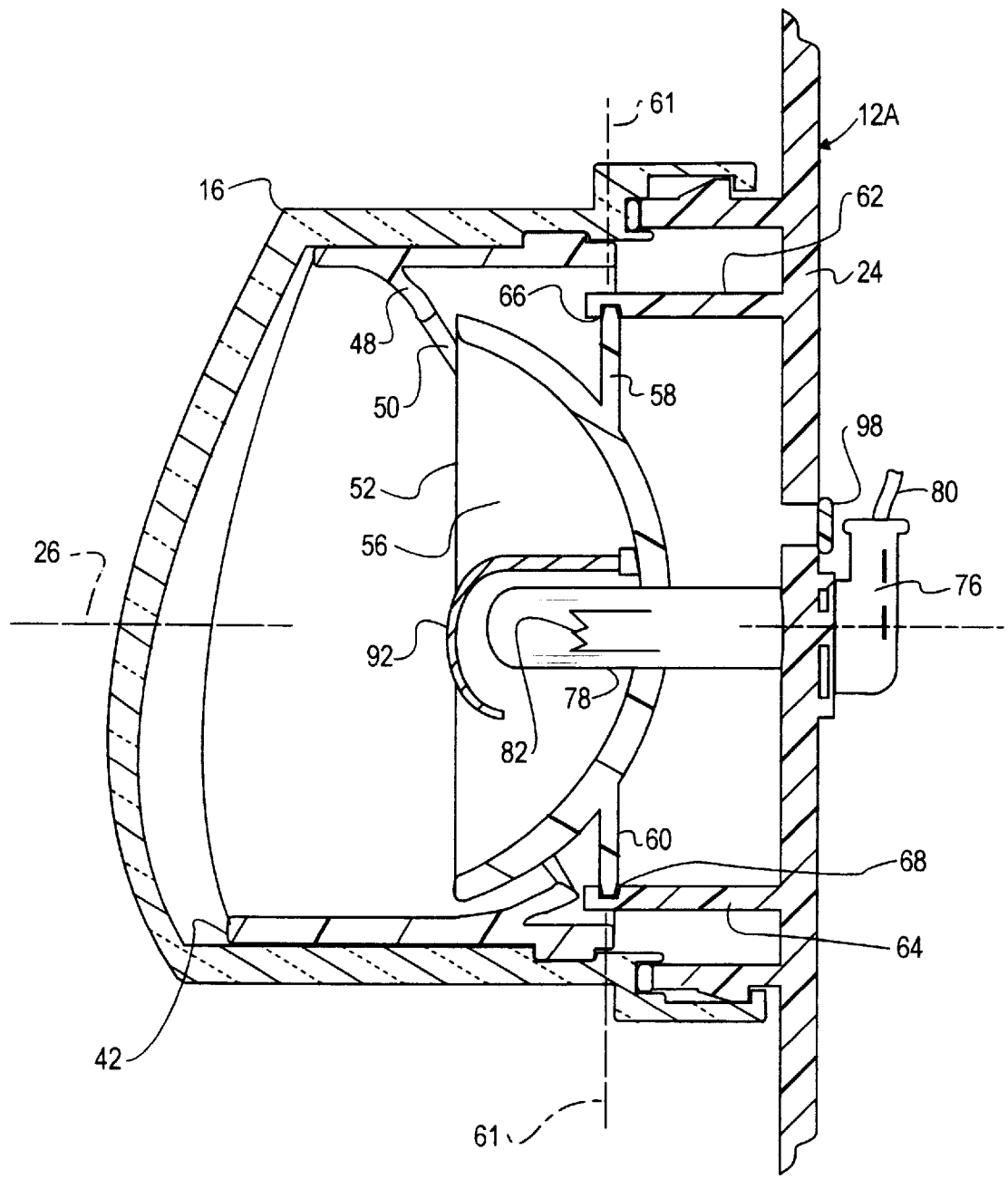
FIG. 5 is view similar to FIG. 1 showing a second example.

In the embodiment 12 that has just been described, axis 61 is disposed rearward of, and hence non-coincident with, filament 82. FIG. 5 shows a different embodiment of headlamp assembly 12A. The same reference numerals previously used and described are also used in FIG. 5 to identify like components. Headlamp assembly 12A is constructed and arranged such that with socket 76 and bulb 78 in place as shown, filament 82 is disposed substantially at the intersection of center line 26 and axis 61. Reflecting surface 56 has a parabolic geometry with a focal point, or focus, that is also substantially at the intersection of center line 26 and axis 61 where the bulb filament 82 is located. In this way filament 82 will remain substantially at the focus of the parabola for all positions of reflector 52 about axis 61. In other words, the focal point of the bulb and the focus of the parabola on which reflecting surface 56 lies will remain coincident over an adjustment range of the reflector. Headlamp assembly 12A will therefore project a well-concentrated light beam along a direction established by the position to which reflector 52 is set by positioning mechanism 84.

By appropriate dimensioning, pivot support arms 62, 64 are endowed with limited flexible resiliency that allows their distal ends to be spread apart for the purpose of assembling reflector 52 to housing 14. Such assembly is accomplished by first spreading the distal ends of the pivot support arms slightly farther apart than the dimension of reflector 52 as measured between the distal ends of pivots 58, 60. Then, reflector 52 is disposed to align the pivots with the bearings 66, 68 provided by the through-holes in the distal ends of the pivot support arms. Finally, the pivot support arms are released, and as they relax, they capture the pivots to journal the circular intermediate portions of the pivots in the bearings 66, 68.

Assembly of lens 16 to housing 14 is accomplished by aligning the lens frontally of the housing and advancing the two together. Lens catches 40 flex outwardly as they pass over housing catches 30, and as gasket 36 attains sealing relationship between the lens and housing, catches 40 relax to lodge their free ends behind catches 30. Removal of the lens may be accomplished by gently prying lens catches 40 out of catching with the housing catches and pulling the lens off the housing.

If desired, lens 16 may be fabricated to include optical features that act on the light beam as it emanates from the headlamp assembly. In the two examples, interior 20 is vented to the exterior by a vent 98 mounted in wall 24. Such a vent may be a small membrane that allows humid air to escape interior 20.

The integration of various components in the inventive headlamp assembly affords manufacturing and assembly conveniences and economies. In addition to the functional and constructional features already described, the inventive lamp assembly can be conveniently serviced and repaired. If the need arises, a lens, bezel, reflector, bulb, or bulb shield can be replaced from the front of the vehicle.

While a presently preferred embodiment has been illustrated and described, it is to be appreciated that the invention may be practiced in various forms within the scope of the following claims.

What is claimed is:

1. A lamp assembly comprising:
   a lamp housing and a lens cooperatively forming a lamp enclosure that bounds an interior of the lamp assembly;
   the lamp housing comprising a rear wall containing a through-hole that opens to the interior of the lamp assembly;
   an electric light bulb comprising a base received in a receptacle of an electric light bulb socket that is disposed in the through-hole to place a light emitting element of the bulb within the interior of the lamp assembly;
   a reflector comprising a wall having a mirrored reflecting surface that is concave about an imaginary main axis and disposed to collect light emitted by the light emitting element of the bulb and reflect the collected light as a beam through the lens;
   the reflector being disposed within the interior of the lamp assembly frontally of the through-hole in the lamp housing wall and comprising, along the imaginary main axis, a through-aperture for providing clearance to the electric light bulb;
   a mounting for the reflector comprising formations that project from the enclosure within the lamp interior at either side of the main axis;
   the reflector comprising formations, each of which respectively associates with a respective one of the mounting formations, to mount the reflector for selective positioning arcuately about an imaginary other axis that is non-parallel to the imaginary main axis thereby selectively position the mirrored surface;
   and a positioning mechanism on the lamp enclosure that is operatively connected to the reflector for selectively positioning the reflector about the imaginary other axis to aim the reflected beam of light in a desired direction through the lens, and
   in which the rear wall of the lamp housing comprises another through-hole, the positioning mechanism comprises a mounting element mounting the positioning mechanism on the enclosure in the another through-hole and a positioning element that passes from exterior of the enclosure, through the mounting element, to an operative connection with the reflector, and the positioning element is operable from the exterior of the enclosure to selectively position the reflector about the imaginary other axis.

2. A lamp assembly as set forth in claim 1 in which the mounting element comprises a screw thread that is engaged by a mating screw thread on the positioning element such that turning of the positioning element positions the positioning element relative to the mounting element to cause positioning of the reflector element about the imaginary other axis.

3. A lamp assembly as set forth in claim 2 in which the operative connection of the positioning element to the reflector comprises a ball joint connection.

4. A lamp assembly as set forth in claim 1 in which the mounting formations are integral extensions of synthetic material that forms the lamp assembly housing and provide respective pivots for the reflector formations disposed on the imaginary other axis symmetrically about the imaginary main axis.

5. A lamp assembly as set forth in claim 1 in which the reflector formations are integral extensions of synthetic material that forms the reflector.

6. A lamp assembly comprising:
   a lamp housing and a lens cooperatively forming a lamp enclosure that bounds an interior of the lamp assembly;
   the lamp housing comprising a rear wall containing a through-hole that opens to the interior of the lamp assembly;
   an electric light bulb comprising a base received in a receptacle of an electric light bulb socket that is disposed in the through-hole to place a light emitting element of the bulb within the interior of the lamp assembly;
   a reflector comprising a wall having a mirrored reflecting surface that is concave about an imaginary main axis and disposed to collect light emitted by the light emitting element of the bulb and reflect the collected light as a beam through the lens;
   the reflector being disposed within the interior of the lamp assembly frontally of the through-hole in the lamp housing wall and comprising, along the imaginary main axis, a through-aperture for providing clearance to the electric light bulb;
   a mounting for the reflector comprising formations that project from the enclosure within the lamp interior at either side of the main axis;
   the reflector comprising formations, each of which respectively associates with a respective one of the mounting formations, to mount the reflector for selective positioning arcuately about an imaginary other axis that is non-parallel to the imaginary main axis thereby selectively position the mirrored surface;
   and a positioning mechanism on the lamp enclosure that is operatively connected to the reflector for selectively positioning the reflector about the imaginary other axis to aim the reflected beam of light in a desired direction through the lens, and including a bezel disposed within the lamp interior to block external viewing of the interior through a portion of lens that is covered by the bezel.

7. A lamp assembly as set forth in claim 6 in which the lens comprises a front wall and a cylindrical side wall extending rearward from a perimeter of the front wall, and the bezel comprises a ring disposed against the side wall of the lens, including a flange that has a radially inner edge circumscribing an opening that circumscribes and provides dimensional clearance to the reflector.

8. A lamp assembly as set forth in claim 1 in which the imaginary other axis perpendicularly intersects the imaginary main axis, the bulb has a focal point from which light emitted by the light emitting element emanates, and the focal point is disposed at the intersection of the imaginary other axis and the imaginary main axis.

9. A lamp assembly as set forth in claim 8 in which the mirrored reflecting surface lies on a portion of a parabola that has a focus which is disposed at the focal point of the bulb and which remains at the focal point of the bulb over a range of positioning of the reflector by the positioning mechanism.

10. A lamp assembly comprising:

a lamp housing and a lens cooperatively forming a lamp enclosure that bounds an interior of the lamp assembly;

an electric light bulb comprising a light emitting element disposed within the interior of the lamp assembly;

a reflector comprising a wall having a mirrored reflecting surface that is concave about an imaginary main axis and disposed to collect light emitted by the light emitting element of the bulb and reflect the collected light as a beam through the lens;

a mounting that mounts the reflector for selective positioning with respect to an imaginary other axis that is non-parallel to the imaginary main axis to thereby selectively position the mirrored surface;

a positioning mechanism for selectively positioning the reflector to aim the beam of light in a desired direction through the lens;

the lens comprising a front wall and a cylindrical side wall extending rearward from a perimeter of the front wall; and a bezel disposed within the lamp interior to block external viewing of the interior through a portion of lens that is covered by the bezel, the bezel comprising a ring disposed against the side wall of the lens, including a flange that has a radially inner edge circumscribing an opening that circumscribes and provides dimensional clearance to the reflector; and in which the imaginary other axis perpendicularly intersects the imaginary main axis, the bulb has a focal point from which light emitted by the light emitting element emanates, the focal point is disposed at the intersection of the imaginary other axis and the imaginary main axis, the mirrored reflecting surface lies on a portion of a parabola that has a focus which is disposed at the focal point of the bulb and which remains at the focal point of the bulb over a range of positioning of the reflector by the positioning mechanism.

11. A lamp assembly comprising:

a lamp housing and a lens cooperatively forming a lamp enclosure that bounds an interior of the lamp assembly;

an electric light bulb comprising a light emitting element disposed within the interior of the lamp assembly;

a reflector comprising a wall having a mirrored reflecting surface that is concave about an imaginary main axis and disposed to collect light emitted by the light emitting element of the bulb and reflect the collected light as a beam through the lens;

a mounting that mounts the reflector for selective positioning with respect to an imaginary other axis that is non-parallel to the imaginary main axis to thereby selectively position the mirrored surface;

a positioning mechanism for selectively positioning the reflector to aim the beam of light in a desired direction through the lens;

the lens comprising a front wall and a cylindrical side wall extending rearward from a perimeter of the front wall; and a bezel disposed within the lamp interior to block external viewing of the interior through a portion of lens that is covered by the bezel, the bezel comprising a ring disposed against the side wall of the lens, including a flange that has a radially inner edge circumscribing an opening that circumscribes and provides dimensional clearance to the reflector; and in which one of the bezel ring and the side wall of the lens comprises raised formations, the other of the bezel ring and the side wall of the lens comprises depressed formations, and the raised formations fits within the depressed formations to retain the bezel to the lens.

* * * * *